(12) United States Patent
Kalavagattu et al.

(10) Patent No.: US 11,438,294 B2
(45) Date of Patent: Sep. 6, 2022

(54) SYSTEM AND METHOD FOR AUTO-FORMATTING MESSAGES BASED ON LEARNED MESSAGE TEMPLATES

(71) Applicant: YAHOO ASSETS LLC, Dulles, VA (US)

(72) Inventors: Aravind Kalavagattu, Dublin, CA (US); Sudharsan Vasudevan, Santa Clara, CA (US)

(73) Assignee: YAHOO ASSETS LLC, Dulles, VA (US)

( * ) Notice: Subject to any disclaimer, the term of this patent is extended or adjusted under 35 U.S.C. 154(b) by 227 days.

(21) Appl. No.: 14/495,064

(22) Filed: Sep. 24, 2014

(65) Prior Publication Data

US 2016/0087925 A1 Mar. 24, 2016

(51) Int. Cl.

| | |
|---|---|
| *G06F 15/16* | (2006.01) |
| *H04L 51/42* | (2022.01) |
| *H04L 67/10* | (2022.01) |
| *H04L 43/10* | (2022.01) |
| *H04L 67/565* | (2022.01) |
| *H04L 51/066* | (2022.01) |

(52) U.S. Cl.
CPC .............. *H04L 51/22* (2013.01); *H04L 43/10* (2013.01); *H04L 51/066* (2013.01); *H04L 67/10* (2013.01); *H04L 67/2823* (2013.01)

(58) Field of Classification Search
CPC .......... H04L 51/22; H04L 43/10; H04L 67/10
USPC .................................................. 709/206, 204
See application file for complete search history.

(56) References Cited

U.S. PATENT DOCUMENTS

| | | | | |
|---|---|---|---|---|
| 8,990,321 | B1* | 3/2015 | Korn | H04L 51/066 709/202 |
| 9,176,945 | B1* | 11/2015 | Berner | G06F 40/205 |
| 2010/0017294 | A1* | 1/2010 | Mancarella | H04L 51/063 705/14.55 |
| 2012/0011208 | A1* | 1/2012 | Erhart | G06Q 50/01 709/206 |
| 2013/0212190 | A1* | 8/2013 | Patil | G06N 5/04 709/206 |

* cited by examiner

*Primary Examiner* — Joon H Hwang
*Assistant Examiner* — Joel Mesa
(74) *Attorney, Agent, or Firm* — James J. DeCarlo; Greenberg Traurig, LLP

(57) ABSTRACT

The present disclosure describes systems and methods for email management that leverages information derived from a sender's message activity with particular recipients in order to automatically format subsequent messages to those recipients according to the derived information. The present disclosure describes determining message templates associated with messages sent to repetitive recipients, and applying those determined templates upon composition of subsequent messages to the same recipients. Message templates comprise information associated with a message's settings, layout, message content, content type(s), a message type and the like. The determination of message templates and template information for application to messages being composed can be based on learned expressions and/or patterns from a sender's message activity or behavior. Additionally, the message templates can be utilized for monetization purposes in order to serve targeted advertisements when communicating with repetitive recipient users.

20 Claims, 6 Drawing Sheets

FIG. 4        400

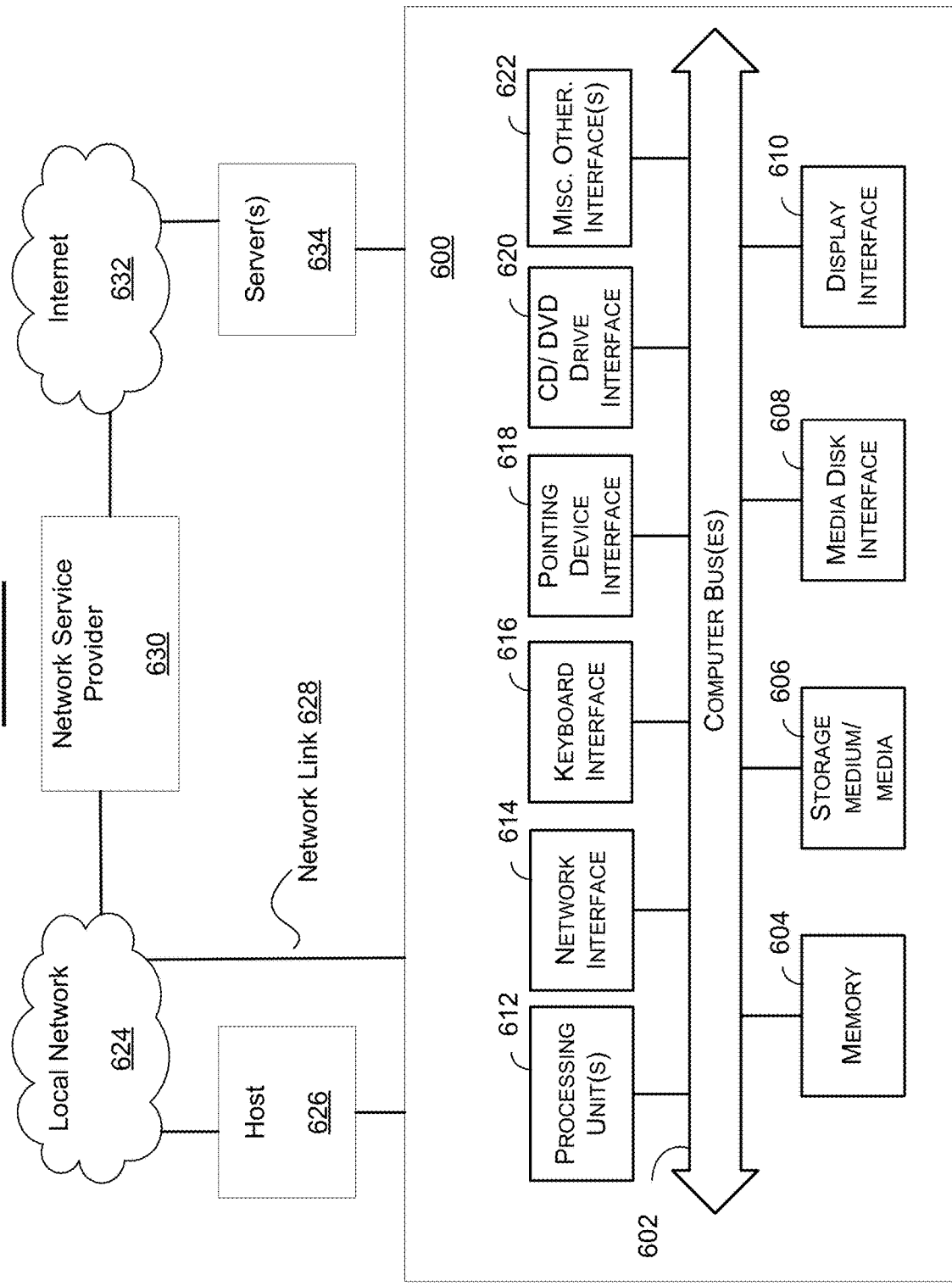

SYSTEM AND METHOD FOR AUTO-FORMATTING MESSAGES BASED ON LEARNED MESSAGE TEMPLATES

This application includes material that is subject to copyright protection. The copyright owner has no objection to the facsimile reproduction by anyone of the patent disclosure, as it appears in the Patent and Trademark Office files or records, but otherwise reserves all copyright rights whatsoever.

FIELD

The present disclosure relates generally to email template identification, and more particularly towards systems and methods for auto-formatting message templates based on past interactions between a sender and recipient(s) in order to improve a user's experience with email.

RELATED ART

Electronic mail ("email") usage has become ubiquitous for online users as larger numbers of people are able to access the Internet from an array of devices. In addition to providing a way for individuals to communicate more efficiently with each other, electronic mail also provides an effective form of communication for individuals, businesses, organizations, and other entities interested in communicating with large groups of people, such as friends, family, current and customers, and the like.

Composing an email involves the typing of a subject, one or more recipients, and a message body. Composing and sending messages to repetitive recipients can become a time consuming and tedious chore, as commonly contacted recipients are typically in reception of sender customized messages. Conventional message programs and platforms have associated static default settings and/or templates for sending messages.

SUMMARY

The present disclosure describes systems and methods for email management that leverages information derived from a message sender's message activity in order to automatically format subsequent messages according to the derived information. The disclosed systems and methods address shortcomings in the art by streamlining the process of writing and sending messages to repetitive recipients. The present disclosure describes determining message templates associated with messages sent to repetitive recipients, and applying those determined templates upon composition of subsequent messages to the same recipients.

According to some embodiments, the message templates comprise information associated with a message's settings, layout, message content, content type(s), a message type and the like. The determination of message templates and template information for application to messages being composed can be based on learned expressions and/or patterns from a sender's message activity or behavior. Such expressions and/or patterns may be derived or identified based on any known or to be known machine learning, pattern recognition, data mining or knowledge discovery in databases (KDD) algorithms or techniques, such as, but not limited to, Sparse Factor Analysis (SFA), Hidden Markov Models (HMMs), Support Vector Machines (SVMs), Bayesian Methods, and the like. According to some embodiments, the formatting of composed messages based on identified message templates can be utilized for monetization purposes, where targeted advertisements can be served in connection with the formatted messages based upon data (e.g., content) identified from the formatted messages.

In accordance with one or more embodiments, a method is disclosed which includes monitoring, via a computing device on a network, communications sent from a first user to a second user, said monitoring comprising analyzing said communications to identify regular expressions within each message; compiling, via the computing device, a message template associated with the second user based on said identified regular expressions, said message template comprising information dictating how subsequent messages to said second user are to be formatted; monitoring, via the computing device, a mailbox of said first user, said monitoring comprising determining that said first user is drafting a new message to said second user; formatting, via the computing device, said new message based on said message template; and communicating, via the computing device over the network, said formatted message to said second user.

In accordance with one or more embodiments, a non-transitory computer-readable storage medium is provided, the computer-readable storage medium tangibly storing thereon, or having tangibly encoded thereon, computer readable instructions that when executed cause at least one processor to perform a method for auto-formatting message templates based on past interactions between a sender and recipient(s).

In accordance with one or more embodiments, a system is provided that comprises one or more computing devices configured to provide functionality in accordance with such embodiments. In accordance with one or more embodiments, functionality is embodied in steps of a method performed by at least one computing device. In accordance with one or more embodiments, program code to implement functionality in accordance with one or more such embodiments is embodied in, by and/or on a computer-readable medium.

BRIEF DESCRIPTION OF THE DRAWINGS

The foregoing and other objects, features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure:

FIG. 6 is a block diagram illustrating architecture of a hardware device in accordance with one or more embodiments of the present disclosure.

DESCRIPTION OF EMBODIMENTS

Figure 1:
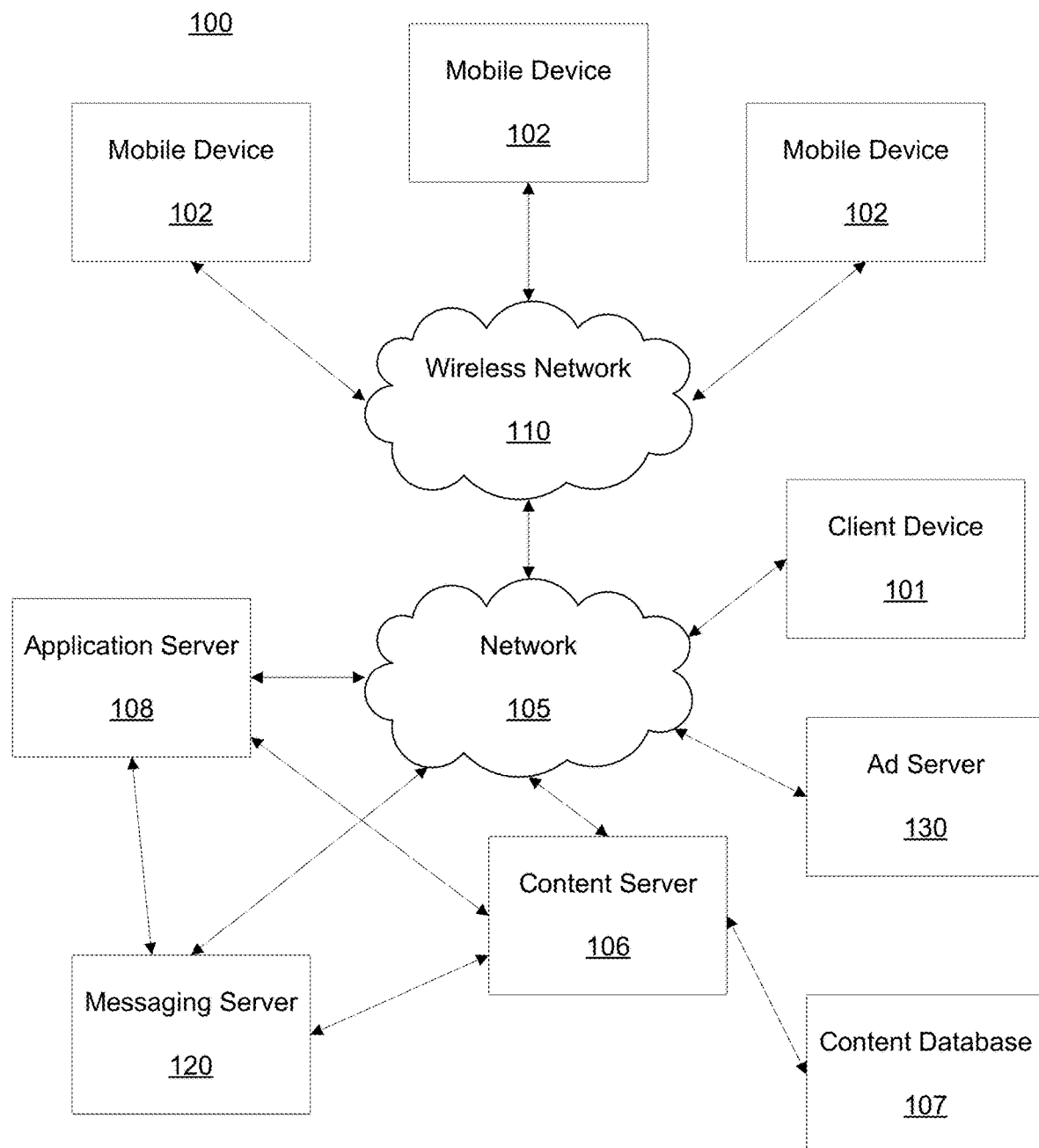
FIG. 1 is a schematic diagram illustrating an example of a network within which the systems and methods disclosed herein could be implemented according to some embodiments of the present disclosure.

The present disclosure will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer, special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

These computer program instructions can be provided to a processor of a general purpose computer, special purpose computer, ASIC, or other programmable data processing apparatus, such that the instructions, which execute via the processor of the computer or other programmable data processing apparatus, implement the functions/acts specified in the block diagrams or operational block or blocks.

For the purposes of this disclosure a computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For the purposes of this disclosure a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, cellular or any combination thereof. Likewise, sub-networks, which may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a telephone line or link, for example.

For purposes of this disclosure, a "wireless network" should be understood to couple client devices with a network. A wireless network may employ stand-alone ad-hoc networks, mesh networks, Wireless LAN (WLAN) networks, cellular networks, or the like. A wireless network may further include a system of terminals, gateways, routers, or the like coupled by wireless radio links, or the like, which may move freely, randomly or organize themselves arbitrarily, such that network topology may change, at times even rapidly. A wireless network may further employ a plurality of network access technologies, including Long Term Evolution (LTE), WLAN, Wireless Router (WR) mesh, or 2nd, 3rd, or 4th generation (2G, 3G, or 4G) cellular technology, or the like. Network access technologies may enable wide area coverage for devices, such as client devices with varying degrees of mobility, for example.

For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For purposes of this disclosure, a client (or consumer or user) device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device an Near Field Communication (NFC) device, a Personal Digital Assistant (PDA), a handheld computer, a tablet computer, a laptop computer, a set top box, a wearable computer, an integrated device combining various features, such as features of the forgoing devices, or the like.

A client or computing device may vary in terms of capabilities or features. Claimed subject matter is intended to cover a wide range of potential variations. For example, a cell phone may include a numeric keypad or a display of limited functionality, such as a monochrome liquid crystal display (LCD) for displaying text. In contrast, however, as another example, a web-enabled client device may include one or more physical or virtual keyboards, mass storage, one or more accelerometers, one or more gyroscopes, global positioning system (GPS) or other location-identifying type capability, or a display with a high degree of functionality, such as a touch-sensitive color 2D or 3D display, for example.

A client or computing device may include or may execute a variety of operating systems, including a personal computer operating system, such as a Windows, iOS or Linux, or a mobile operating system, such as iOS, Android, or Windows Mobile, or the like. A client device may include or may execute a variety of possible applications, such as a client software application enabling communication with other devices, such as communicating one or more messages, such as via email, short message service (SMS), or multimedia message service (MMS), including via a network, such as a social network, including, for example, Facebook®, LinkedIn®, Twitter®, Flickr®, or Google+®, Instagram™, to provide only a few possible examples. A client device may also include or execute an application to communicate content, such as, for example, textual content, multimedia content, or the like. A client device may also include or execute an application to perform a variety of possible tasks, such as browsing, searching, playing various forms of content, including locally stored or streamed video, or games (such as fantasy sports leagues). The foregoing is provided to illustrate that claimed subject matter is intended to include a wide range of possible features or capabilities.

The principles described herein may be embodied in many different forms. Currently, message templates or settings used to compose an email are static, as they are based on predefined preferences. Such preferences may be default settings associated with the messaging application or program. The preferences may also be based on user input preferences, which essentially edit the default preferences according to the user's desired configuration of composed messages. Typically, there are two types of email templates: global templates and site-specific templates. An email template generally has the following properties:

| | |
|---|---|
| Display name | The name of the template displayed in the user interface. |
| Code name | The name of the template used in code. |
| E-mail type | Identifies the type of functionality to which the template is related. This can be used to categorize and filter e-mail templates. |
| To | E-mail address of the recipient(s). |
| Cc | E-mail addresses of copy recipients. |
| Bcc | E-mail addresses of blind copy recipients. These will get a copy of the e-mail, but won't see the addresses of other recipients in the mail. |
| Subject | Subject of the e-mail. |

| | |
|---|---|
| HTML version | Defines the content that is used for the template when sending e-mails in HTML format. The preferred format can be selected using the Site Manager -> Settings -> System -> E-mails -> E-mail format setting. |
| Plain text version | Plain text version of the e-mail template. |

Currently, senders (i.e., users composing a message to at least one recipient) have to edit and reapply their preferences each time they compose and send an email message, regardless of the intended recipient(s). Such preferences can include, but are not limited to, a message's template, settings, layout, message type, delivery instructions (e.g., conditions for delivery), content, content type, salutation, signature, language settings, font, font color, font type, and the like.

For example, user Bob is drafting an email to his Boss at work, therefore, he desires to the message to conclude with a plain salutation, such as "best regards,"; whereas when Bob is sending an email to his wife, he desires the salutation to read "love,". In another example, if user Bob is sending a message to his grandmother, he may desire to have the message set with a bigger and/or bolder font for increased readability. In yet another example, if Bob is sending a message to a relative in India, he would want the language and accent of the message to be set to Hindi.

Conventional systems and techniques would require user Bob to manually set such preferences from the above examples every time he composed a message to each recipient. The present disclosure remedies such shortcomings by auto-formatting (or auto-populating) messages to a recipient based on previously applied (and customized) settings and message templates from previous messages to the recipient. As discussed in more detail below, whenever a user sends a message to a recipient, the preferences used in drafting the message (i.e., template) and the recipient's email identifier (ID) are recorded and stored in profile for the sender in a central storage. Central storage can be located at or associated with, but not limited to, a hosting server, such as a Yahoo! Mail® server, on the cloud, a local device, an application server, content server, or associated with a particular device and/or application (e.g., browser), and the like. In some embodiments, the information stored in central storage can be associated with and/or stored in connection with the sender's "Address Book" (or contacts list) for easy and efficient retrieval.

The preferences identified from previous message activity of a sender can be determined based on learned expressions and/or patterns from a sender's message activity or behavior. Such expressions and/or patterns may be derived or identified based on any known or to be known machine learning, pattern recognition, data mining or knowledge discovery in databases (KDD) algorithms or techniques, such as, but not limited to, Sparse Factor Analysis (SFA), Hidden Markov Models (HMMs), Support Vector Machines (SVMs), Bayesian Methods, and the like. According to some embodiments, in order for preferences to be saved for application in subsequent messages, a threshold must be satisfied, which can be set by the sender or message platform, or some combination thereof.

Thus, according to embodiments of the present disclosure, the next time the user inputs a recipient's email address in a message compose screen (e.g., in the "To", "Cc" and/or "Bcc" field while composing a message), saved settings from previous communications with the recipient are fetched and automatically applied to the message. For example, Bob previously sent a message to his grandmother which was configured with a bigger and bolder font. When Bob begins composing a message to his grandmother again, the message will be automatically formatted with a bigger and bolder font.

According to some embodiments, the formatting of the message can occur immediately upon input of a recipient's email address. That is, if the user inputs the recipient's information in the "To" line prior to drafting the message, the message will be drafted with those settings applied. In some embodiments, the settings may only be applied upon hitting send on the message, or after sending a number of messages formatted similarly thus having been identified as a preference of the user by repeated use. That is, the message may be drafted having the appearance of a default setting, but when a "send" instruction is received or a number or threshold is achieved or met, the message can then be formatted according to the stored preferences. In some embodiments, formatting of the message can occur at the device or application drafting the message, at the server communicating the message, and/or at the device/application receiving the message, or some combination thereof.

According to some embodiments, settings/preferences can also be associated with multiple recipients. That is, if there were previous interactions between a sender and a set of multiple recipients (above a threshold) or a set mailing list or alias, the settings/preferences from those interactions can be applied to subsequent communications between the same set of recipients. A set of recipients can be associated with a group of recipients, and in some embodiments an email list or email group.

As such, auto-formatting of message preferences and templates can occur across devices, application programs, browsers and/or messaging platforms. The disclosed systems and methods enable increased efficiency in drafting messages, which thereby increases user engagement. According to some embodiments, the application of the settings/preferences/templates may be associated with a displayed alert to the sending user, as discussed in more detail below. Such alerting mechanism provides the user with the ability to confirm application of some or all of the settings, and additionally prevents accidentally sending messages to wrong recipients and/or with undesired settings. Indeed, this also enables preferences to be updated according to the most recent settings applied by the sender.

According to some embodiments, as discussed in more detail below, particular recipients may be identified as users' of interest for advertising purposes. That is, a sender will have preferences saved for users the sender typically and frequently communicates with. As such, advertisers would like to capitalize on such frequent communications. As discussed in more detail below, a determination is made whether a message being sent is auto-formatted. If so, the message content from the message may be extracted or identified and utilized for serving relevant advertisements to the recipient of the message. Therefore, information associated with messages between a sender and frequently contacted recipients can be used for monetization purposes and targeted advertising, which can lead to an increased click-through rate (CTR) of such ads and/or an increase in the advertiser's return on investment (ROI) for serving such ads.

Certain embodiments will now be described in greater detail with reference to the figures. In general, with reference to FIG. 1, a system 100 in accordance with an embodiment of the present disclosure is shown. FIG. 1 shows components of a general environment in which the systems and methods discussed herein may be practiced. Not all the components may be required to practice the disclosure, and variations in the arrangement and type of the components may be made without departing from the spirit or scope of the disclosure. As shown, system 100 of FIG. 1 includes local area networks ("LANs")/wide area networks ("WANs")—network 105, wireless network 110, mobile devices (client devices) 102-104 and client device 101. FIG. 1 additionally includes a variety of servers, such as content server 106, application (or "App") server 108, messaging server 120 and advertising ("ad") server 130.

One embodiment of mobile devices 102-103 is described in more detail below. Generally, however, mobile devices 102-104 may include virtually any portable computing device capable of receiving and sending a message over a network, such as network 105, wireless network 110, or the like. Mobile devices 102-104 may also be described generally as client devices that are configured to be portable. Thus, mobile devices 102-104 may include virtually any portable computing device capable of connecting to another computing device and receiving information. Such devices include multi-touch and portable devices such as, cellular telephones, smart phones, display pagers, radio frequency (RF) devices, infrared (IR) devices, Personal Digital Assistants (PDAs), handheld computers, laptop computers, wearable computers, tablet computers, smart watches, integrated devices combining one or more of the preceding devices, and the like. As such, mobile devices 102-104 typically range widely in terms of capabilities and features. For example, a cell phone may have a numeric keypad and a few lines of monochrome LCD display on which only text may be displayed. In another example, a web-enabled mobile device may have a touch sensitive screen, a stylus, and several lines of color LCD display in which both text and graphics may be displayed.

A web-enabled mobile device may include a browser application that is configured to receive and to send web pages, web-based messages, and the like. The browser application may be configured to receive and display graphics, text, multimedia, and the like, employing virtually any web based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message.

Mobile devices 102-104 also may include at least one client application that is configured to receive content from another computing device. The client application may include a capability to provide and receive textual content, graphical content, audio content, and the like. The client application may further provide information that identifies itself, including a type, capability, name, and the like. In one embodiment, mobile devices 102-104 may uniquely identify themselves through any of a variety of mechanisms, including a phone number, Mobile Identification Number (MIN), an electronic serial number (ESN), or other mobile device identifier.

In some embodiments, mobile devices 102-104 may also communicate with non-mobile client devices, such as client device 101, or the like. In one embodiment, such communications may include sending and/or receiving messages, share photographs, audio clips, video clips, or any of a variety of other forms of communications. Client device 101 may include virtually any computing device capable of communicating over a network to send and receive information. The set of such devices may include devices that typically connect using a wired or wireless communications medium such as personal computers, multiprocessor systems, microprocessor-based or programmable consumer electronics, network PCs, or the like. Thus, client device 101 may also have differing capabilities for displaying navigable views of information.

Client devices 101-104 computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

Wireless network 110 is configured to couple mobile devices 102-104 and its components with network 105. Wireless network 110 may include any of a variety of wireless sub-networks that may further overlay stand-alone ad-hoc networks, and the like, to provide an infrastructure-oriented connection for mobile devices 102-104. Such sub-networks may include mesh networks, Wireless LAN (WLAN) networks, cellular networks, and the like.

Wireless network 110 may further include an autonomous system of terminals, gateways, routers, and the like connected by wireless radio links, and the like. These connectors may be configured to move freely and randomly and organize themselves arbitrarily, such that the topology of wireless network 110 may change rapidly. Wireless network 110 may further employ a plurality of access technologies including 2nd (2G), 3rd (3G), and/or 4th (4G) generation radio access for cellular systems, WLAN, Wireless Router (WR) mesh, and the like. Access technologies such as 2G, 3G, 4G and future access networks may enable wide area coverage for mobile devices, such as mobile devices 102-104 with various degrees of mobility. For example, wireless network 110 may enable a radio connection through a radio network access such as Global System for Mobil communication (GSM), General Packet Radio Services (GPRS), Enhanced Data GSM Environment (EDGE), Wideband Code Division Multiple Access (WCDMA), and the like. In essence, wireless network 110 may include virtually any wireless communication mechanism by which information may travel between mobile devices 102-104 and another computing device, network, and the like.

Network 105 is configured to couple content server 106, application server 108, or the like, with other computing devices, including, client device 101, and through wireless network 110 to mobile devices 102-104. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, network 105 includes any communication method by which information may travel between content servers 106, application server 108, client device 101, and/or other computing devices.

Within the communications networks utilized or understood to be applicable to the present disclosure, such networks will employ various protocols that are used for communication over the network. Signal packets communicated via a network, such as a network of participating digital communication networks, may be compatible with or compliant with one or more protocols. Signaling formats or protocols employed may include, for example, TCP/IP, UDP, DECnet, NetBEUI, IPX, APPLETALK™, or the like. Versions of the Internet Protocol (IP) may include IPv4 or IPv6. The Internet refers to a decentralized global network of networks. The Internet includes local area networks (LANs), wide area networks (WANs), wireless networks, or long haul public networks that, for example, allow signal packets to be communicated between LANs. Signal packets may be communicated between nodes of a network, such as, for example, to one or more sites employing a local network address. A signal packet may, for example, be communicated over the Internet from a user site via an access node coupled to the Internet. Likewise, a signal packet may be forwarded via network nodes to a target site coupled to the network via a network access node, for example. A signal packet communicated via the Internet may, for example, be routed via a path of gateways, servers, etc. that may route the signal packet in accordance with a target address and availability of a network path to the target address.

According to some embodiments, the present disclosure may also be utilized within a social networking site. A social network refers generally to a network of individuals, such as acquaintances, friends, family, colleagues, or co-workers, coupled via a communications network or via a variety of sub-networks. Potentially, additional relationships may subsequently be formed as a result of social interaction via the communications network or sub-networks. In some embodiments, multi-modal communications may occur between members of the social network. Individuals within one or more social networks may interact or communication with other members of a social network via a variety of devices. Multi-modal communication technologies refers to a set of technologies that permit interoperable communication across multiple devices or platforms, such as cell phones, smart phones, tablet computing devices, personal computers, televisions, set-top boxes, SMS/MMS, email, instant messenger clients, forums, social networking sites, or the like.

In some embodiments, the disclosed networks 110 and/or 105 may comprise a content distribution network(s). A "content delivery network" or "content distribution network" (CDN) generally refers to a distributed content delivery system that comprises a collection of computers or computing devices linked by a network or networks. A CDN may employ software, systems, protocols or techniques to facilitate various services, such as storage, caching, communication of content, or streaming media or applications. A CDN may also enable an entity to operate or manage another's site infrastructure, in whole or in part.

The content server 106 may include a device that includes a configuration to provide content via a network to another device. A content server 106 may, for example, host a site, such as an email platform or social networking site, or a personal user site (such as a blog, vlog, online dating site, and the like). A content server 106 may also host a variety of other sites, including, but not limited to business sites, educational sites, dictionary sites, encyclopedia sites, wikis, financial sites, government sites, and the like. Devices that may operate as content server 106 include personal computers desktop computers, multiprocessor systems, microprocessor-based or programmable consumer electronics, network PCs, servers, and the like.

Content server 106 can further provide a variety of services that include, but are not limited to, email services, photo services, web services, third-party services, audio services, video services, email services, instant messaging (IM) services, SMS services, MMS services, FTP services, voice over IP (VOIP) services, or the like. Such services, for example the email services and email platform, can be provided via the messaging server 120. Examples of content may include images, text, audio, video, or the like, which may be processed in the form of physical signals, such as electrical signals, for example, or may be stored in memory, as physical states, for example.

An ad server 130 comprises a server that stores online advertisements for presentation to users. "Ad serving" refers to methods used to place online advertisements on websites, in applications, or other places where users are more likely to see them, such as during an online session or during computing platform use, for example. Various monetization techniques or models may be used in connection with sponsored advertising, including advertising associated with user. Such sponsored advertising includes monetization techniques including sponsored search advertising, non-sponsored search advertising, guaranteed and non-guaranteed delivery advertising, ad networks/exchanges, ad targeting, ad serving and ad analytics.

For example, a process of buying or selling online advertisements may involve a number of different entities, including advertisers, publishers, agencies, networks, or developers. To simplify this process, organization systems called "ad exchanges" may associate advertisers or publishers, such as via a platform to facilitate buying or selling of online advertisement inventory from multiple ad networks. "Ad networks" refers to aggregation of ad space supply from publishers, such as for provision en masse to advertisers. For web portals like Yahoo!®, advertisements may be displayed on web pages resulting from a user-defined search based at least in part upon one or more search terms. Advertising may be beneficial to users, advertisers or web portals if displayed advertisements are relevant to interests of one or more users. Thus, a variety of techniques have been developed to infer user interest, user intent or to subsequently target relevant advertising to users.

One approach to presenting targeted advertisements includes employing demographic characteristics (e.g., age, income, sex, occupation, etc.) for predicting user behavior, such as by group. Advertisements may be presented to users in a targeted audience based at least in part upon predicted user behavior(s). Another approach includes profile-type ad targeting. In this approach, user profiles specific to a user may be generated to model user behavior, for example, by tracking a user's path through a web site or network of sites, and compiling a profile based at least in part on pages or advertisements ultimately delivered. A correlation may be identified, such as for user purchases, for example. An identified correlation may be used to target potential purchasers by targeting content or advertisements to particular users. During presentation of advertisements, a presentation system may collect descriptive content about types of advertisements presented to users. A broad range of descriptive content may be gathered, including content specific to an advertising presentation system. Advertising analytics gathered may be transmitted to locations remote to an advertising presentation system for storage or for further evaluation. Where advertising analytics transmittal is not immediately available, gathered advertising analytics may be stored by an advertising presentation system until transmittal of those advertising analytics becomes available.

Servers 106, 108, 120 and 130 may be capable of sending or receiving signals, such as via a wired or wireless network, or may be capable of processing or storing signals, such as in memory as physical memory states. Devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally, a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

In an embodiment, users are able to access services provided by servers 106, 108, 120 and/or 130. This may include in a non-limiting example, email servers, social networking services servers, SMS servers, IM servers, MMS servers, exchange servers, photo-sharing services servers, and travel services servers, via the network 105 using their various devices 101-104. In some embodiments, message applications, such as a Yahoo! Mail® or Yahoo! Messenger®, can be hosted by the application server 108. Thus, the application server 108 can store various types of applications and application related information including application data and user profile information.

In another example, messaging server 120 can host email applications; therefore, the messaging server 120 can store various types of applications and application related information including email application data and user profile information. It should also be understood that content server 106 can also store various types of data related to the content and services provided by content server 106 in an associated content database 107, as discussed in more detail below. Embodiments exist where the network 105 is also coupled with/connected to a Trusted Search Server (TSS) which can be utilized to render content in accordance with the embodiments discussed herein.

Moreover, although FIG. 1 illustrates servers 106, 108, 120 and 130 as single computing devices, respectively, the disclosure is not so limited. For example, one or more functions of servers 106, 108, 120 and/or 130 may be distributed across one or more distinct computing devices. Moreover, in one embodiment, servers 106, 108, 120 and/or 130 may be integrated into a single computing device, without departing from the scope of the present disclosure.

Figure 2:
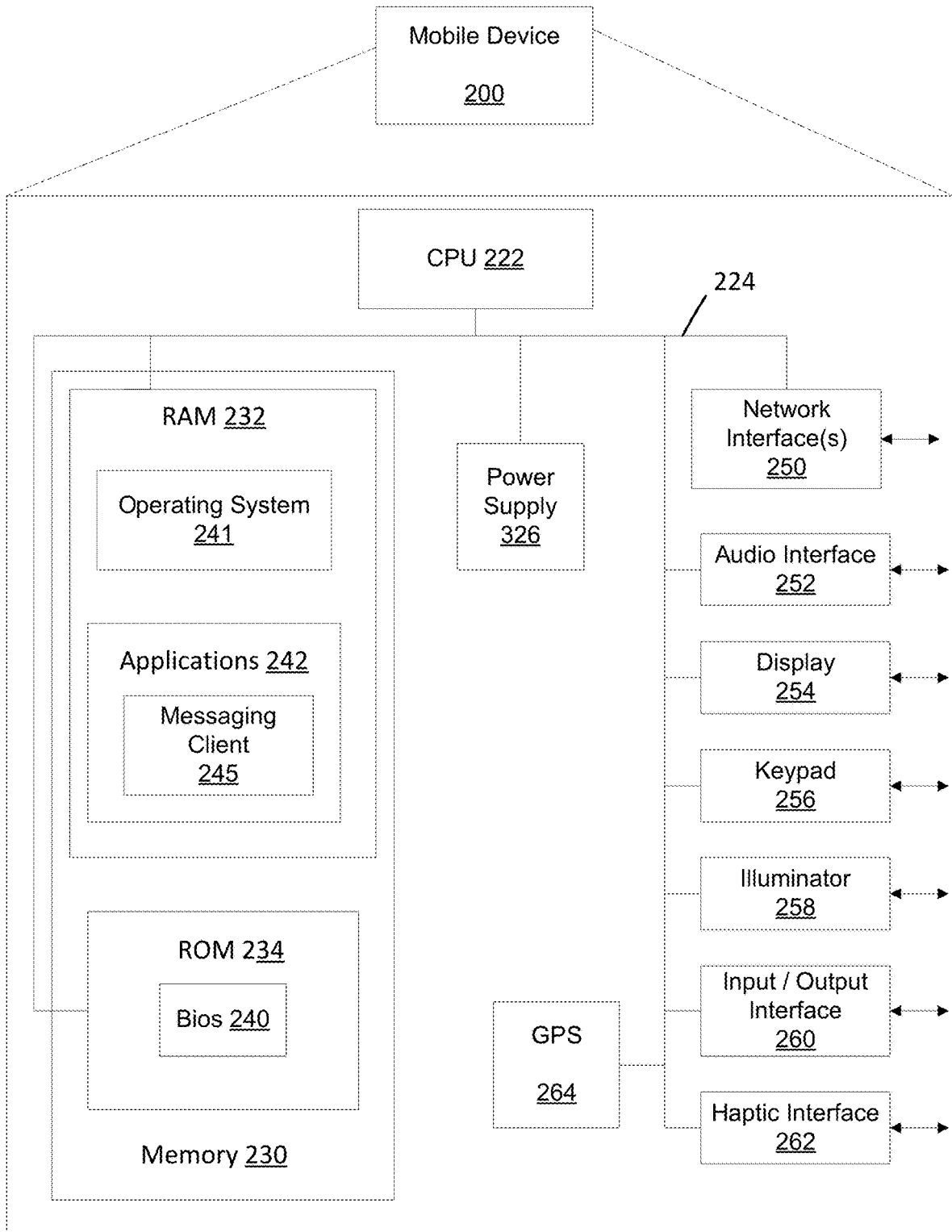
FIG. 2 depicts is a schematic diagram illustrating a client device in accordance with some embodiments of the present disclosure.

FIG. 2 is a schematic diagram illustrating a client device showing an example embodiment of a client device that may be used within the present disclosure. Client device 200 may include many more or less components than those shown in FIG. 2. However, the components shown are sufficient to disclose an illustrative embodiment for implementing the present disclosure. Client device 200 may represent, for example, client devices discussed above in relation to FIG. 1.

As shown in the figure, Client device 200 includes a processing unit (CPU) 222 in communication with a mass memory 230 via a bus 224. Client device 200 also includes a power supply 226, one or more network interfaces 250, an audio interface 252, a display 254, a keypad 256, an illuminator 258, an input/output interface 260, a haptic interface 262, and an optional global positioning systems (GPS) receiver 264. Power supply 226 provides power to Client device 200. A rechargeable or non-rechargeable battery may be used to provide power. The power may also be provided by an external power source, such as an AC adapter or a powered docking cradle that supplements and/or recharges a battery.

Client device 200 may optionally communicate with a base station (not shown), or directly with another computing device. Network interface 250 includes circuitry for coupling Client device 200 to one or more networks, and is constructed for use with one or more communication protocols and technologies including, but not limited to, global system for Client communication (GSM), code division multiple access (CDMA), time division multiple access (TDMA), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (WiMax), SIP/RTP, or any of a variety of other wireless communication protocols. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Keypad 256 may comprise any input device arranged to receive input from a user. For example, keypad 256 may include a push button numeric dial, or a keyboard. Keypad 256 may also include command buttons that are associated with selecting and sending images. Illuminator 258 may provide a status indication and/or provide light. Illuminator 258 may remain active for specific periods of time or in response to events. For example, when illuminator 258 is active, it may backlight the buttons on keypad 256 and stay on while the client device is powered. Also, illuminator 258 may backlight these buttons in various patterns when particular actions are performed, such as dialing another client device. Illuminator 258 may also cause light sources positioned within a transparent or translucent case of the client device to illuminate in response to actions.

Client device 200 also comprises input/output interface 260 for communicating with external devices, such as a headset, or other input or output devices not shown in FIG. 2. Input/output interface 260 can utilize one or more communication technologies, such as USB, infrared, Bluetooth™, or the like. Haptic interface 262 is arranged to provide tactile feedback to a user of the client device. For example, the haptic interface may be employed to vibrate client device 200 in a particular way when the Client device 200 receives a communication from another user.

Optional GPS transceiver 264 can determine the physical coordinates of Client device 200 on the surface of the Earth, which typically outputs a location as latitude and longitude values. GPS transceiver 264 can also employ other geo-positioning mechanisms, including, but not limited to, tri-angulation, assisted GPS (AGPS), E-OTD, CI, SAI, ETA, BSS or the like, to further determine the physical location of Client device 200 on the surface of the Earth. It is understood that under different conditions, GPS transceiver 264 can determine a physical location within millimeters for Client device 200; and in other cases, the determined physical location may be less precise, such as within a meter or significantly greater distances. In one embodiment, however, Client device may through other components, provide other information that may be employed to determine a physical location of the device, including for example, a MAC address, IP address, or the like.

Mass memory 230 includes a RAM 232, a ROM 234, and other storage means. Mass memory 230 illustrates another example of computer storage media for storage of information such as computer readable instructions, data structures, program modules or other data. Mass memory 230 stores a basic input/output system ("BIOS") 240 for controlling low-level operation of Client device 200. The mass memory also stores an operating system 241 for controlling the operation of Client device 200. It will be appreciated that this component may include a general purpose operating system such as a version of UNIX, or LINUX™, or a specialized client communication operating system such as Windows Client™, or the Symbian® operating system. The operating system may include, or interface with a Java virtual machine module that enables control of hardware components and/or operating system operations via Java application programs.

Memory 230 further includes one or more data stores, which can be utilized by Client device 200 to store, among other things, applications 242 and/or other data. For example, data stores may be employed to store information that describes various capabilities of Client device 200. The information may then be provided to another device based on any of a variety of events, including being sent as part of a header during a communication, sent upon request, or the like. At least a portion of the capability information may also be stored on a disk drive or other storage medium (not shown) within Client device 300.

Applications 242 may include computer executable instructions which, when executed by Client device 200, transmit, receive, and/or otherwise process audio, video, images, and enable telecommunication with another user of another client device. Other examples of application programs include calendars, browsers, contact managers, task managers, transcoders, database programs, word processing programs, security applications, spreadsheet programs, games, search programs, and so forth. Applications 242 may further include messaging client 245 that is configured to send, to receive, and/or to otherwise process messages using SMS, MMS, IM, email, VOIP, and/or any of a variety of other messaging communication protocols. Although a single messaging client 245 is illustrated it should be clear that multiple messaging clients may be employed. For example, one messaging client may be configured to manage SMS messages, where another messaging client manages IM messages, and yet another messaging client is configured to manage serving advertisements, emails, or the like.

Having described the components of the general architecture employed within the disclosed systems and methods, the components' general operation with respect to the disclosed systems and methods will now be described.

Figure 3:
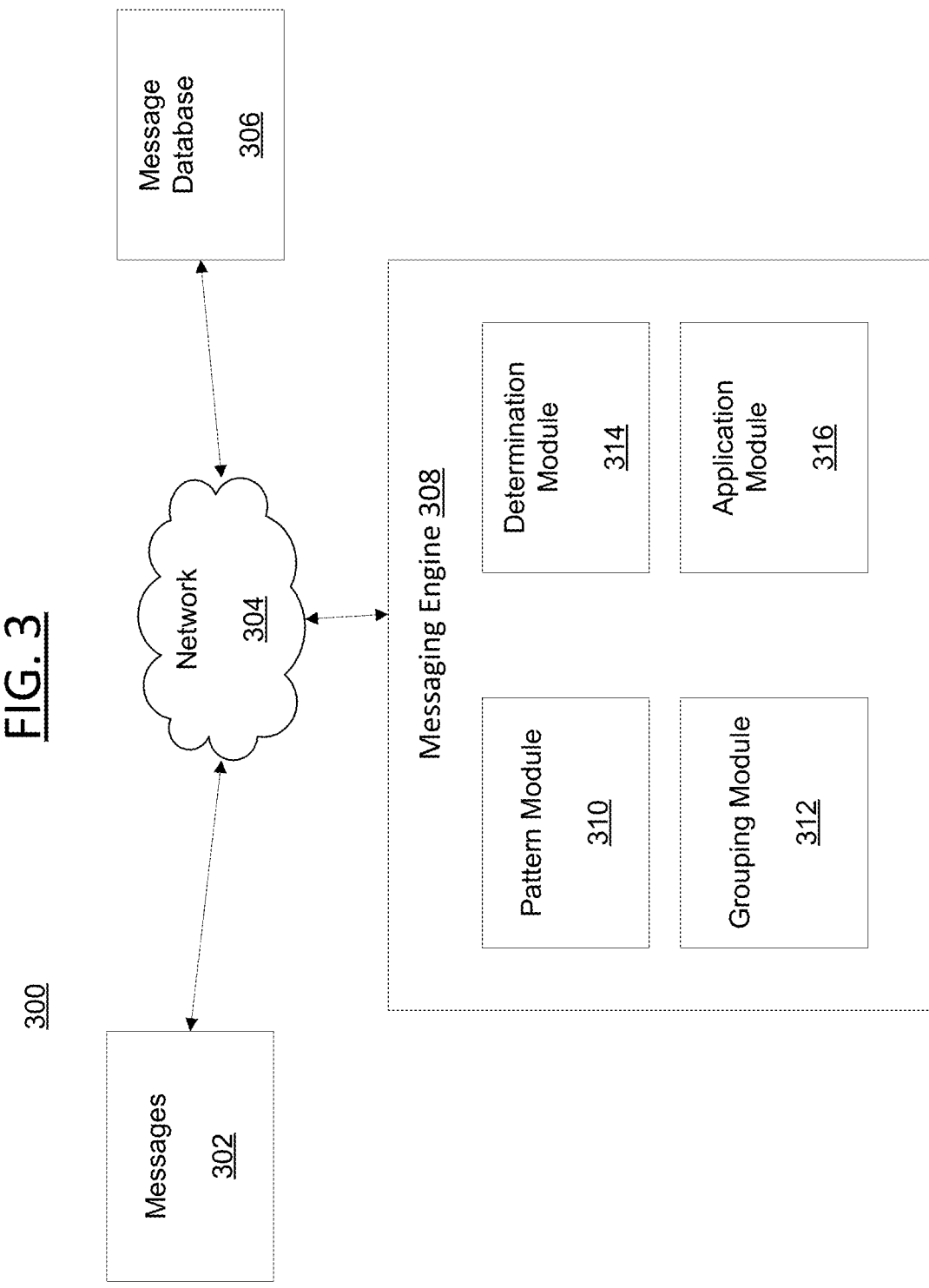
FIG. 3 is a schematic block diagram illustrating components of a system in accordance with embodiments of the present disclosure.

FIG. 3 is a block diagram illustrating the components of system 300 for performing the systems and methods discussed herein. FIG. 3 includes a plurality of messages 302, a network 304, a messaging engine 308 and a database 306 for storing resources, such as messages, among other data associated with users' messaging accounts. The message engine 308 could be hosted by an email service provider, web server, content provider, ad server, a user's computing device, or any combination thereof. The plurality of messages 302 can be any type of message. Examples of such messages 302 can include HTML forms, email messages, comments to an article or website, online forum posts/entries, word processing documents, help desk messages, portable document format (PDF) documents and/or other types of documents. The messages 302 can be provided to the message engine 308 or accessed by a computer program or device that can access the messages.

In some embodiments, the messages 302 can be stored in a database of stored messages 306, generally viewed by users through electronic mailboxes, which is associated with an email provider, such as Yahoo! Mail®. As discussed above and in more detail below, database 306 can be associated with a central storage including a hosting server, such as a Yahoo! Mail® server, on the cloud, a local device, an application server, content server, or associated with a particular device and/or application (e.g., browser), and the like, which stores the message template information and recipient information according to a (sending) user's account or profile. The database 306 can be any type of database or memory that can store the messages 302, user account information, and associated message template information (also referred to as settings or preferences), as discussed in more detail below. For purposes of the present disclosure, email messages as a whole are discussed within some embodiments; however, it should not be construed to limit the applications of the systems and methods discussed herein. Indeed, while reference is made throughout the instant disclosure to email messages, other forms of electronic documents or transmissions (e.g., Short Message Service (SMS) messages, Multi-media Message Service (MMS) messages, social media messages, and the like) can be received and/or accessed and processed by the message engine 308 according to the systems and methods discussed herein.

As discussed above, with reference to FIG. 1, the network 304 can be any type of network such as, but not limited to, a wireless network, a local area network (LAN), wide area network (WAN), the Internet, or a combination thereof. The network 304 facilitates connectivity between the messages 302, the message engine 308, and the database of stored resources 306.

The message engine 308 includes a pattern module 310, a grouping module 312, a determination module 314 and an application module 316. It should be understood that the engine(s) and modules discussed herein are non-exhaustive, as additional or fewer engines and/or modules, and/or sub-engines and/or sub-modules may be applicable to the embodiments of the systems and methods discussed. The operations, configurations and functionalities of each module, and their role within embodiments of the present disclosure will be discussed with reference to FIG. 4, whereby the components of system 300 are implemented to perform the steps and processes of Process 400.

Figure 4:
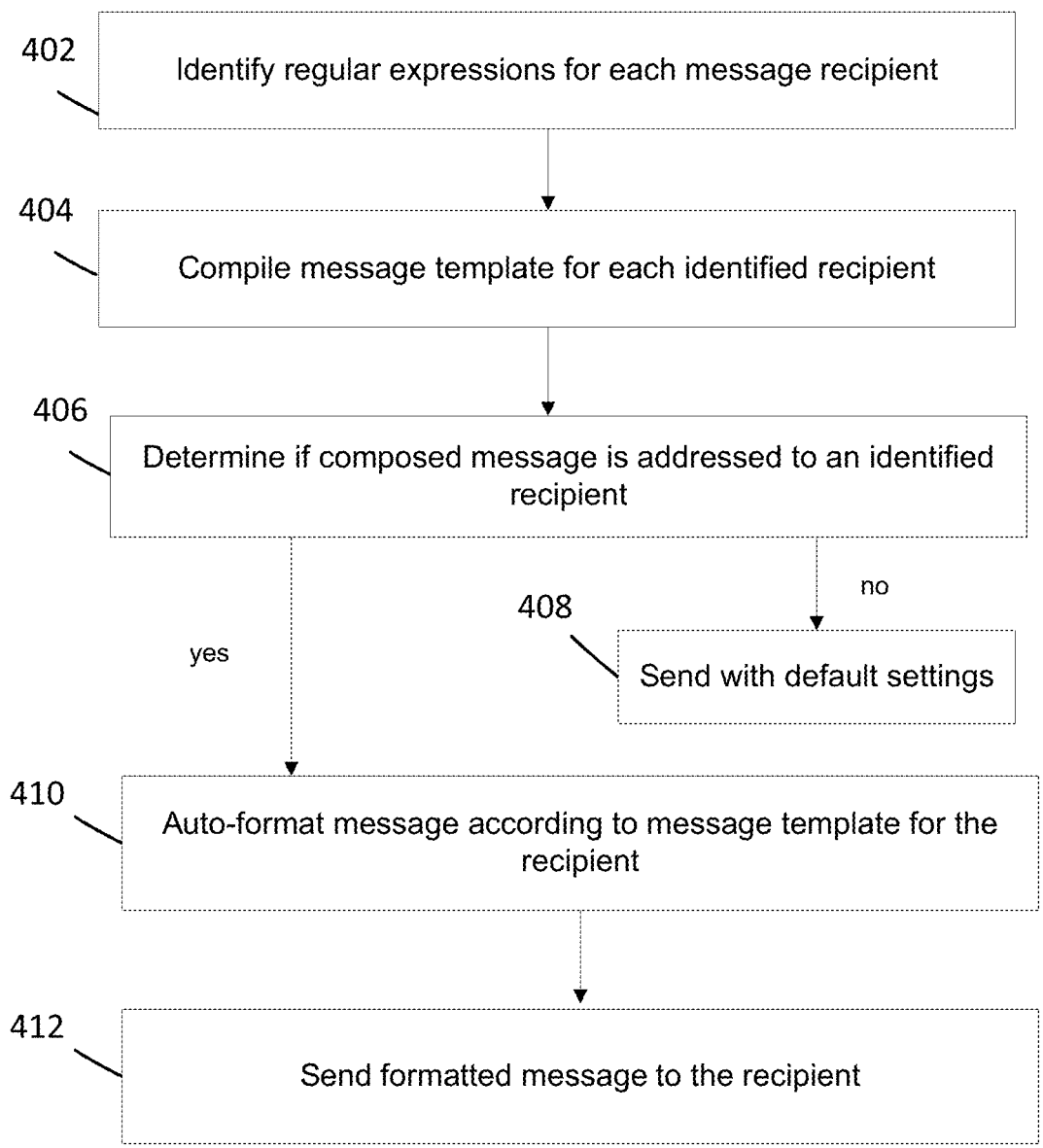
FIG. 4 is a flowchart illustrating steps performed in accordance with some embodiments of the present disclosure.

FIG. 4 is a Process 400 diagram illustrating steps performed in accordance with embodiments of the present disclosure. As discussed above, the present disclosure involves applying learned preferences or settings from messages between a sender and a recipient(s) as a message template when composing subsequent messages to the same recipient(s). The preferences, which dictate the configuration of a message as a message template for a composed message, can include, but are not limited to, message settings, layout, message type, delivery instructions (e.g., conditions for delivery), content, content type, salutation, signature, language settings, font, font color, font type, and the like. The determination of the preferences can be based on learned expressions and/or patterns from a sender's message activity or behavior with each recipient. Such expressions and/or patterns may be derived or identified based on any known or to be known machine learning, pattern recognition, data mining or knowledge discovery in databases (KDD) algorithms or techniques, as discussed above.

In Step 402, a user's email traffic is monitored and analyzed to identify recipients a user frequently communicates with and which preferences are associated with each message communication from the user to each recipient. That is, a user's email activity is monitored, and from such monitoring, each recipient the user communicates with above a threshold is identified. Additionally, for each identified recipient, the preferences for each communication are analyzed; specifically, the preferences of the communications originating from the user and being sent to recipient. According to some embodiments, as discussed below, preferences can be based on the identification of regular expressions occurring within messages to particular recipients. Thus, Step 402 involves analyzing a user's outbound email traffic (e.g., identifying each message and parsing each message) to determine which recipients the user is communicating with and which expressions are including in or make up such messages. This step is performed by the pattern module 310 of the messaging engine 308. In some embodiments, such monitoring and identification is performed separately for every recipient, and in some embodiments, the monitoring and identification in Step 402 is globally applied across all messages the user communicates or transmits. Additionally, communicated messages over a network are analyzed to identify the recipient's identity, e.g., the recipient's email address. As such, each identified regular expression is associated with a specific recipient (or set of recipients) as discussed in more detail below.

In some embodiments, the monitoring of emails occurs from (or within) a single message platform, e.g., Yahoo! Mail®; and in some embodiments, the monitoring of messages occurs across multiple platforms, such as Yahoo! Mail®, Google Mail®, Hotmail®, and other personal and business email platforms, such as Microsoft Outlook®, and the like. According to some embodiments, the monitoring occurring in Step 402 may be based in part or entirely on analysis of a user's past message history. In some embodiments, the monitoring in Step 402 may occur in real-time or near-real time, where the recipients and expressions identified, as discussed herein, are continually updated to reflect up-to-date and accurate preferences associated with a user's message activity and/or profile.

This monitoring occurs by analyzing all outgoing messages (in some embodiments only analyzing messages to all known and/or trusted accounts or user selected recipients), and parsing message traffic on a network to identify regular expressions associated with the electronic messages. This monitoring (or identifying) occurs for every user's inbox or a subset or user's (such as for example user's that have subscribed to, or paid for such service). As discussed above, such monitoring and/or analysis can be based any known or to be known learning/monitoring techniques and/or algorithms in order to efficiently and properly compile such regular expressions, and/or any data attributes and details related to the messages on a network. According to some embodiments, monitoring can occur offline and/or online, in order to continuously update and/or build a listing of identified regular expressions, as discussed in more detail below.

As understood by those of skill in the art, a regular expression (often abbreviated as "regex or regexp") is a sequence of data, such as characters, that forms a pattern. This pattern can be used for pattern matching within strings or string matching, for example, within email messages. Each character in the regular expression is either understood as a metacharacter or a regular character. The regular character is typically understood to carry its literal meaning. The metacharacter is a character that has a special meaning to a computer program (e.g., email program, i.e., Yahoo! Mail®). Thus, in accordance with some embodiments, regular expressions dictate a pattern, layout or structure of content, such as email templates. In some embodiments, regular expressions can be a term, word, phrase or combination of words and characters or numbers that typically appears in an email message. By way of non-limiting example, solely for illustration purposes and not to be construed as limiting in nature regarding scope or methodology for deriving patterns from regular expressions in messages, the pattern module 310 can identify various features for HTML messages including, but not limited to, a determined distance between HTML tags, HTML comments, or the content and/or layout of the message itself.

Therefore, turning back to Step 402, process 400 begins by identifying recipients a user contacts at or above a threshold, and those regular expressions that appear at or above a threshold in the messages between the user and each recipient. The threshold for identifying the recipients and/or the threshold of expressions may be based on a minimum fixed percentage of email traffic, or a number of emails sent to or exchanged, with a recipient and/or traffic associated with a particular domain. In some embodiments, if a user contacts a recipient once, and the communication involves a customized layout (e.g., preference setting), this may be determined as satisfying the applicable thresholds in connection with the implementation of following steps for Process 400.

In Step 404, for each identified recipient, listing of regular expressions is compiled. That is, for each recipient the user has communicated with (that satisfies the threshold), a regular expression listing is compiled, whereby, in some embodiments, only those expressions that satisfy a threshold are included in the expression listing. This step is performed by the grouping module 312 of the messaging engine 308. These expressions listings are referred to as "message templates." That is, as discussed above, regular expressions involve sequences of data respective patterns or structures of messages. Therefore, the expression listings represent message templates that provide information regarding an email message's layout and other structural message information (e.g., data and metadata). Thus, the expression listing represents message templates that are to be applied to messages for each identified recipient. As discussed above, the compiled message templates (and expression listings) are stored in database 306 in association with an identified recipient. Such stored information is organized according to a user's account, such that the templates and recipient information associated with a specific (sending) user is readily accessible and retrievable due to its direct correspondence to the user's message account.

By way of a non-limiting example, in order to illustrate Steps 402-404, user Jane has previously communicated with Jim and Jack. In the past messages to Jim, Jane has edited the default font color from "black" to the color "red." In the messages to Jack, Jane has altered the text from English to "Spanish", in addition to changing the font to "Courier New." Therefore, for messages from Jane to Jim, an expression listing, which is a representation of a message template, is compiled that indicates the font color of "red." An identifier associated with Jim (e.g., Jim's email address) and the expression listing is stored in association with Jane's account for retrieval upon Jane drafting a subsequent message to Jim. A non-limiting example of a stored message template for Jane-Jim communications could include the following information:

| E-mail type | Default (according to mail platform) |
|---|---|
| To | Jim's email address |
| Cc | None |
| Bcc | None |
| Subject | N/a |
| Expressions | Font_Color = "Red" |

For messages between Jane and Jack, Jack's identifier is stored along with an expression listing comprising an indication that subsequent messages should be formatted to the Spanish language and the font should be "Courier New." A non-limiting example of a stored message template for Jane-Jack communications could include the following information:

| E-mail type | Default (according to mail platform) |
|---|---|
| To | Jack's email address |
| Cc | None |
| Bcc | None |
| Subject | N/a |
| Expressions | Font = "Courier New" |
| | Language = "Spanish" |

Turning back to Process 400, Step 406 involves determining if a composed message is being addressed to an identified recipient. That is, when a user is composing a message, upon the user entering an address for a recipient, a determination is made whether the recipient is a previously identified recipient (Step 402) and/or has an associated message template. Step 406 is performed by the determination module 314. In some embodiments, Step 406 involves the determination module 316 monitoring a user's inbox to determine if a new message is being drafted.

If there is no template associated with the entered recipient, then Process 400 proceeds to Step 408 where the message is formatted according to default settings. As discussed above, the default settings can be associated with the device, mail program/application, and the like. If the determination Step 406 reveals that the recipient has an associated stored message template, then the Process proceeds to Step 410 where the message is automatically formatted according to the definitions in the template (or the expressions within the expression listing).

As discussed above, depending on the type of template information, auto-formatting may include auto-populating a message with specific content (for example, if a salutation or other type of text typically added to messages to a recipient). Step 410 is performed by the application module 316. Step 410 includes identifying the recipient based on the input recipient email address, and retrieving the associated stored template (or expression listing) from storage. The retrieved template/expression listing is automatically applied to the message being drafted. As discussed above, if the message has already been drafted prior to entry of the recipient's address, then the message with be automatically re-formatted according to the information in the message template. If the message body is empty, where the recipient's address is entered prior to drafting of the message, then the message is drafted in accordance with the expressions identified in Steps 402-404.

By way of a non-limiting example, solely for purposes of illustrating an example of Steps 406-410, user Jane enters John's email address in the "To" line of a message. John's email address is used to search the database 306 to determine if a message template has been compiled for messages to John. In this example, John does not have a stored template associated with Jane's account; therefore, the message is formatted according to default settings associated with the message program/application. Jane has the ability to modify these settings, which can then be used as template information for subsequent messages (should, in some embodiments, such communication(s) satisfy the thresholds as discussed above).

Jane then begins drafting another new message and enters Jack's email address (from the above example). A determination is made as to whether Jack's has an associated template, which from the above example, there is one. As such, Jane's email to Jack will be automatically formatted according to such template. For example, the email will be in the "Courier New" font and in the Spanish language. As discussed above, if Jane entered Jack's email address, which triggered the determination and auto-formatting (Steps 406-408), prior to entering text in the message, then the message will be drafted in the Spanish language and in the "Courier New" font. If Jane entered Jack's email address after drafting the message (e.g., entering the subject line and message body), then the message will be automatically re-formatted according to the template's settings. As discussed above, this reformatting may occur automatically upon identification of Jack's email address having an associated template, or may occur upon the message being sent. In some embodiments, the reformatting may occur at Jane's device, at the server or upon delivery to Jack's inbox.

According to some embodiments, as discussed above, expressions/templates (also referred to as preferences) can also be associated with multiple recipients. That is, if there were previous interactions between a sender and a set of multiple recipients (above a threshold), the settings/preferences from those interactions can be applied to subsequent communications between the same set of recipients. Thus, Steps 402-404 can be performed in a similar manner for a multiple recipient set, where the identified recipients and expressions are associated with a template/expression listing for a set of recipients. As such, when the determination in Step 406 is performed, upon a recipient set being entered into the "To" and/or "Cc" or "Bcc" headings in a message, the determination in Step 406 involves determining if all the recipients, as a group of recipients, have an associated message template. If so, the Process 400 proceeds in the same manner for the recipient set as discussed herein with respect to Steps 410-412.

According to some embodiments, Step 410 may also include providing a user with an alert. Such alert may provide an indication to the user that the message is going to be formatted according to the derived settings. Using the above example between Jane and Jack, when Jane enters Jack's email address in the message recipient field, and the Jack's template is retrieved, prior to applying the formatting instructions included Jack's template, Jane may be prompted with a dialog box, alert or window, or some other known or to be known alert or indication supplying Jane with information that the message to Jack is going to be formatted to the Spanish language and the font is going to be "Courier New." From this alert, Jane can have the ability to confirm the changes, deny the changes, and/or confirm some and deny some changes.

For example, Jane can accept all the changes; thus, the template for Jack will remain the same as the auto-formatting. If Jane only accepts some of the changes, for example, only the font style change to "Courier New" is accepted by Jane, then Jack's template can be updated to remove the "Language=Spanish" expression information. As such, in subsequent messages to Jack, only the font will be auto-formatted and the language will be (re)set as English until subsequent changes to messages to Jack from Jane trigger alterations in Jack's template. According to some embodiments, alterations to a template can be effectuated only when the changes occur at or above a threshold, in a similar manner to establishing the expression listing in Steps 402-404.

In Step 412, the formatted message is sent to the intended recipient(s). In some embodiments, the expression listing/message template is then updated with any changes or revisions to the message template, structure or formatting, as discussed above.

Figure 5:
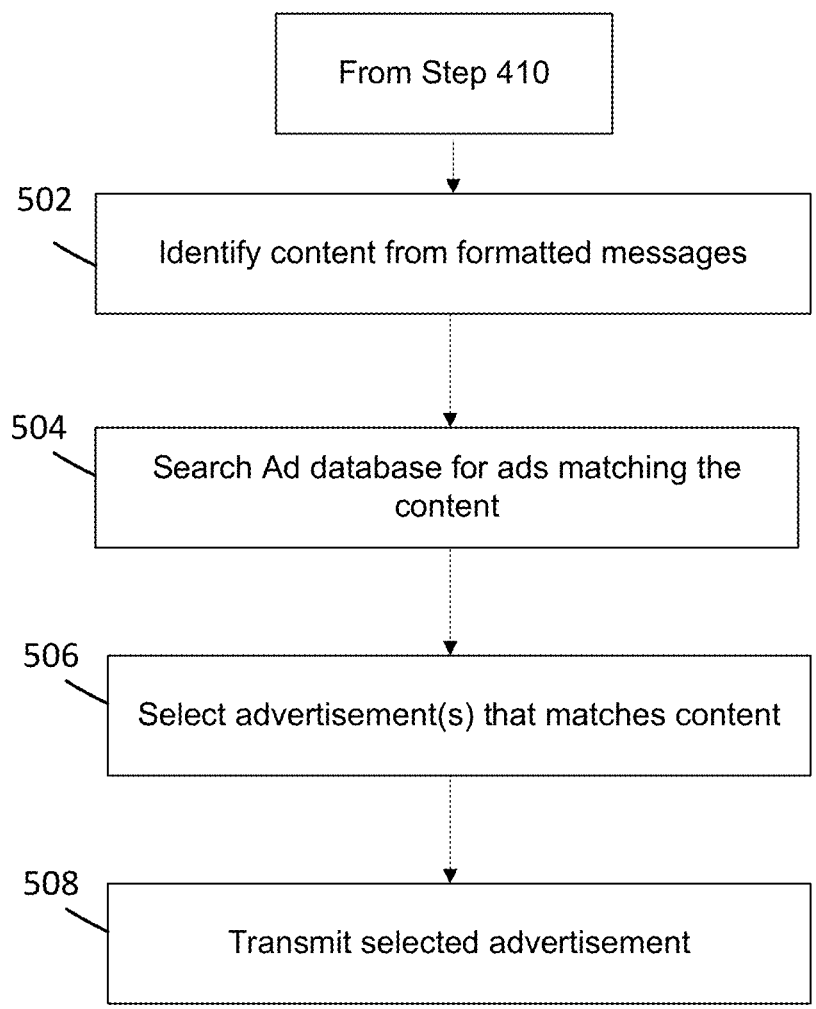
FIG. 5 is a flowchart illustrating steps performed in accordance with some embodiments of the present disclosure.

FIG. 5 illustrates Process 500 for serving relevant advertisements to frequently contacted recipients. Specifically, FIG. 5 illustrates how advertisements are served to recipients of messages based on the disclosed systems and methods herein. Indeed, information associated with messages between a sender and frequently contacted recipients can be used for monetization purposes and targeted advertising. Process 500 is a continuation from Step 410 of Process 400. That is, when a determination is made that a message is to be auto-formatted (Steps 406), and upon the message being formatted (Step 410), Step 502 is triggered which involves identifying content from the formatted messages. In some embodiments, Process 500 may occur only upon transmitting a formatted message (upon performance of Step 412). The identified content can be determined or derived from the title/subject of the message, data from the message body or a message attachment, metadata associated with the message, or any other type of content (data) associated with a message.

Thus, Step 502 involves identifying content from the formatted messages which forms a basis for a context for serving advertisements having a similar context. In Step 504, the content (or content data) is communicated (or shared) from the email platform to an ad platform: an advertisement server 130 and associated ad database. Upon receipt of the content data, the advertisement server 130 performs a search for a relevant advertisement within an associated advertisement database. The search for an advertisement is based at least on the identified content. In some embodiments, the email platform can perform the search of the advertisement platform without having to outsource the identified content.

In Step 504, the advertisement server 130 searches the advertisement database for advertisements that match the identified content. In Step 506, an advertisement is selected (or retrieved) based on the results of Step 504. In some embodiments, the advertisement can be selected based upon the result of Step 504, and modified to conform to attributes of the page, message or inbox upon which the advertisement will be displayed, and/or to the device for which it will be displayed. In some embodiments, as in Step 508, the selected advertisement is shared or communicated via the email platform. In some alternative embodiments, the selected advertisement is sent directly to each recipient user's computing device.

By way of a further non-limiting example illustrating Processes 400 and 500, user Jane is composing a message to Bill. When Jane enters Bill's email address, a determination is made regarding whether there is a stored message template associated with Bill's ID (i.e., email address) (Step 406). Jane has frequently sent messages to Bill (above a threshold) and these messages have been formatted by Jane as HTML messages to include the salutation "Sincerely, Jane", in addition to the font being set to "Arial" and the font size set to "12 point". Therefore, there is a message template associated with Bill's email address stored as follows, for example:

| | |
|---|---|
| E-mail type | HTML |
| To | Bill's email address |
| Expressions | Font = "Arial" |
| | Font_Size = "12" |

The composed message is then auto-formatted as a HTML message to include the salutation, as the message body is set to a 12 point Arial font (Step 410). The message can be sent, as in Step 412, and according to Process 500, content within the message can be identified (Step 502). As discussed above, the identified content can be determined from the title/subject of the message, data from the message body or a message attachment, metadata associated with the message, or any other type of content (data) associated with a message. For example, Jane's email to Bill comprises information related to sushi restaurants in New York, N.Y. Therefore, as in Steps 504-506, an ad platform is searched and an advertisement(s) related to sushi restaurants in NY, N.Y. is identified. The identified advertisement can then be transmitted (Step 508) along with the sent message (from Step 412) to recipient Bill. For example, a sushi restaurant advertisement can be displayed in association with Bill's inbox, or in association with Jane's email, either within the body of the message or in some other manner illustrating the association between the message and the ad (e.g., as a pop-up ad, and ad overlaying a portion of the message, or displayed in a panel adjacent to the message, among other known ways of displaying an ad).

As shown in FIG. 6, computing device internal architecture 600 includes one or more processing units, processors, or processing cores, (also referred to herein as CPUs) 612, which interface with at least one computer bus 602. Also interfacing with computer bus 602 are computer-readable medium, or media, 606, network interface 614, memory 604, e.g., random access memory (RAM), run-time transient memory, read only memory (ROM), media disk drive interface 620 as an interface for a drive that can read and/or write to media including removable media such as floppy, CD-ROM, DVD, media, display interface 610 as interface for a monitor or other display device, keyboard interface 616 as interface for a keyboard, pointing device interface 618 as an interface for a mouse or other pointing device, and miscellaneous other interfaces not shown individually, such as parallel and serial port interfaces and a universal serial bus (USB) interface.

Memory 604 interfaces with computer bus 602 so as to provide information stored in memory 604 to CPU 612 during execution of software programs such as an operating system, application programs, device drivers, and software modules that comprise program code, and/or computer executable process steps, incorporating functionality described herein, e.g., one or more of process flows described herein. CPU 612 first loads computer executable process steps from storage, e.g., memory 604, computer readable storage medium/media 606, removable media drive, and/or other storage device. CPU 612 can then execute the stored process steps in order to execute the loaded computer-executable process steps. Stored data, e.g., data stored by a storage device, can be accessed by CPU 612 during the execution of computer-executable process steps.

Persistent storage, e.g., medium/media 606, can be used to store an operating system and one or more application programs. Persistent storage can also be used to store device drivers, such as one or more of a digital camera driver, monitor driver, printer driver, scanner driver, or other device drivers, web pages, content files, playlists and other files. Persistent storage can further include program modules and data files used to implement one or more embodiments of the present disclosure, e.g., listing selection module(s), targeting information collection module(s), and listing notification module(s), the functionality and use of which in the implementation of the present disclosure are discussed in detail herein.

Network link 628 typically provides information communication using transmission media through one or more networks to other devices that use or process the information. For example, network link 628 may provide a connection through local network 624 to a host computer 626 or to equipment operated by a Network or Internet Service Provider (ISP) 630. ISP equipment in turn provides data communication services through the public, worldwide packet-switching communication network of networks now commonly referred to as the Internet 632.

A computer called a server host 634 connected to the Internet 632 hosts a process that provides a service in response to information received over the Internet 632. For example, server host 634 hosts a process that provides information representing video data for presentation at display 610. It is contemplated that the components of system 600 can be deployed in various configurations within other computer systems, e.g., host and server.

At least some embodiments of the present disclosure are related to the use of computer system 600 for implementing some or all of the techniques described herein. According to one embodiment, those techniques are performed by computer system 600 in response to processing unit 612 executing one or more sequences of one or more processor instructions contained in memory 604. Such instructions, also called computer instructions, software and program code, may be read into memory 604 from another computer-readable medium 606 such as storage device or network link. Execution of the sequences of instructions contained in memory 604 causes processing unit 612 to perform one or more of the method steps described herein. In alternative embodiments, hardware, such as ASIC, may be used in place of or in combination with software. Thus, embodiments of the present disclosure are not limited to any specific combination of hardware and software, unless otherwise explicitly stated herein.

The signals transmitted over network link and other networks through communications interface, carry information to and from computer system 600. Computer system 600 can send and receive information, including program code, through the networks, among others, through network link and communications interface. In an example using the Internet, a server host transmits program code for a particular application, requested by a message sent from computer, through Internet, ISP equipment, local network and communications interface. The received code may be executed by processor 602 as it is received, or may be stored in memory 604 or in storage device or other non-volatile storage for later execution, or both.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

For the purposes of this disclosure the term "user", "subscriber" "consumer" or "customer" should be understood to refer to a consumer of data supplied by a data provider. By way of example, and not limitation, the term "user" or "subscriber" can refer to a person who receives data provided by the data or service provider over the Internet in a browser session, or can refer to an automated software application which receives the data and stores or processes the data.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

What is claimed is:

1. A method comprising: monitoring, via an email server on a network, communications sent from a first user to a second user, said monitoring comprising analyzing said communications during transmission from said first user to said second user, and based on said analysis, identifying a regular expression within each message, wherein said regular expression is selected from a group consisting of layout, salutation, signature, language settings, font, font color and font type; compiling, via the email server, a message template associated with the second user based on said identified regular expression, said message template comprising information dictating how subsequent messages from said first user to said second user are to be formatted, said compiling of the message template occurring prior to drafting of a new message; monitoring, via the email server, a mailbox of said first user, said monitoring comprising analyzing activity of the first user respective to the mailbox and determining, based on said analysis, that said first user is currently drafting the new message to said second user; automatically formatting, via the email server, prior to the new message being sent by the first user, based on an identifier of the second user and during the current drafting of the new message, said new message based on said message template, said automatic formatting comprising sending instructions to a device of the first user as the first user is entering characters while currently drafting said new message that cause the first user device to apply the compiled message template to each entered character prior to the transmittal of the new message, such that the new message is modified into a format that conforms to the message template; and communicating, via the email server over the network, said formatted message to said second user, said communication causing said formatted message to be displayed on a device of the second user according to said formatting.

2. The method of claim 1, wherein said message template is compiled based on said identified regular expression occurring at a frequency satisfying a threshold.

3. The method of claim 1, further comprising:
determining that said communications to said second user are to be monitored when said communications comprise a plurality of messages being sent from the first user to the second user at a frequency satisfying a threshold.

4. The method of claim 1, wherein said determination that said first user is drafting a new message to said second user is based upon said first user entering an identifier of the second user in said new message.

5. The method of claim 4, further comprising:
storing said message template with said identifier of the second user in association with account information of said first user; and
upon said determination that said first user is drafting said new message to said second user, retrieving said message template for application to said new message.

6. The method of claim 1, wherein said regular expression is further selected from a group consisting of message settings, message type, delivery instructions, content, and content type.

7. The method of claim 1, wherein said regular expression comprises a sequence of data that forms a pattern within a message.

8. The method of claim 1, wherein said monitoring said communications with said second user is based upon past message activity between said first user and said second user.

9. The method of claim 1, wherein said message template is based on continuously monitoring message activity from the first user to the second user to determine an updated format of messages.

10. The method of claim 1, further comprising:
communicating an alert to said first user upon said determination that the new message is addressed to said second user, wherein said alert enables said first user to confirm said formatting of said new message.

11. The method of claim 1, wherein said monitoring comprises analyzing all outgoing messages sent from said first user in order to identify message templates for other users satisfying a threshold.

12. The method of claim 1, further comprising:
determining content associated with the formatted message, said content derived from message data associated with the formatted message;
communicating said content to an advertisement platform for identification of an advertisement associated with said content; and
communicating said identified advertisement to said second user for display in association with the display of the formatted message.

13. A non-transitory computer-readable storage medium tangibly encoded with computer-executable instructions, that when executed by a processor associated with an email server, performs a method comprising: monitoring, on a network, communications sent from a first user to a second user, said monitoring comprising analyzing said communications during transmission from said first user to said second user, and based on said analysis, identifying a regular expression within each message, wherein said regular expression is selected from a group consisting of layout, salutation, signature, language settings, font, font color and font type; compiling a message template associated with the second user based on said identified regular expression, said message template comprising information dictating how subsequent messages from said first user to said second user are to be formatted, said compiling of the message template occurring prior to drafting of a new message; monitoring a mailbox of said first user, said monitoring comprising analyzing activity of the first user respective to the mailbox and determining, based on said analysis, that said first user is currently drafting the new message to said second user; automatically formatting, prior to the new message being sent by the first user, based on an identifier of the second user and during the current drafting of the new message, said new message based on said message template, said automatic formatting comprising sending instructions to a device of the first user as the first user is entering characters while currently drafting said new message that cause the first user device to apply the compiled message template to each entered character prior to the transmittal of the new message, such that the new message is modified into a format that conforms to the message template; and communicating, over the network, said formatted message to said second user, said communication causing said formatted message to be displayed on a device of the second user according to said formatting.

14. The non-transitory computer-readable storage medium of claim 13, wherein said message template is compiled based on said identified regular expression occurring at a frequency satisfying a threshold.

15. The non-transitory computer-readable storage medium of claim 13, further comprising:
   determining that said communications to said second user are to be monitored when said communications comprise a plurality of messages being sent from the first user to the second user at a frequency satisfying a threshold.

16. The non-transitory computer-readable storage medium of claim 13, wherein said determination that said first user is drafting a new message to said second user is based upon said first user entering an identifier of the second user in said new message.

17. The non-transitory computer-readable storage medium of claim 16, further comprising:
   storing said message template with said identifier of the second user in association with account information of said first user; and
   upon said determination that said first user is drafting said new message to said second user, retrieving said message template for application to said new message.

18. The non-transitory computer-readable storage medium of claim 13, wherein said regular expression comprises a sequence of data that forms a pattern within a message.

19. The non-transitory computer-readable storage medium of claim 13, further comprising:
   communicating an alert to said first user upon said determination that the new message is addressed to said second user, wherein said alert enables said first user to confirm said formatting of said new message.

20. An email server comprising: a processor; and a non-transitory computer-readable storage medium for tangibly storing thereon program logic for execution by the processor, the program logic comprising: logic executed by the processor for monitoring, on a network, communications sent from a first user to a second user, said monitoring comprising analyzing said communications during transmission from said first user to said second user, and based on said analysis, identifying a regular expression within each message, wherein said regular expression is selected from a group consisting of layout, salutation, signature, language settings, font, font color and font type; logic executed by the processor for compiling a message template associated with the second user based on said identified regular expression, said message template comprising information dictating how subsequent messages from said first user to said second user are to be formatted, said compiling of the message template occurring prior to drafting of a new message; logic executed by the processor for monitoring a mailbox of said first user, said monitoring comprising analyzing activity of the first user respective to the mailbox and determining, based on said analysis, that said first user is currently drafting the new message to said second user; logic executed by the processor for automatically formatting, prior to the new message being sent by the first user, based on an identifier of the second user and during the current drafting of the new message, said new message based on said message template, said automatic formatting comprising sending instructions to a device of the first user as the first user is entering characters while currently drafting said new message that cause the first user device to apply the compiled message template to each entered character prior to the transmittal of the new message, such that the new message is modified into a format that conforms to the message template; and logic executed by the processor for communicating, over the network, said formatted message to said second user, said communication causing said formatted message to be displayed on a device of the second user according to said formatting.

* * * * *